(12) United States Patent
Yuza et al.

(10) Patent No.: US 10,209,485 B2
(45) Date of Patent: Feb. 19, 2019

(54) IMAGING LENS (71) Applicant: KANTATSU CO., LTD., Yaita-shi, Tochigi (JP)

(72) Inventors: Shingo Yuza, Sukagawa (JP); Kenichi Kamada, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 15/389,267

(22) Filed: Dec. 22, 2016

(65) Prior Publication Data
US 2017/0329102 A1 Nov. 16, 2017

(30) Foreign Application Priority Data

Dec. 25, 2015 (JP) .................................. 2015-255116

(51) Int. Cl.
| G02B 9/34 | (2006.01) |
| G02B 13/00 | (2006.01) |
| G02B 13/18 | (2006.01) |
| G02B 13/22 | (2006.01) |

(52) U.S. Cl.
CPC ............. *G02B 13/004* (2013.01); *G02B 9/34* (2013.01); *G02B 13/18* (2013.01); *G02B 13/22* (2013.01)

(58) Field of Classification Search
CPC ...... G02B 13/004; G02B 13/22; G02B 13/18; G02B 9/30–9/58
See application file for complete search history.

(56) References Cited

U.S. PATENT DOCUMENTS

| 6,950,246 | B2 * | 9/2005 | Amanai | ................... | G02B 9/34 359/771 |
| 7,177,098 | B2 * | 2/2007 | Arai | ....................... | G02B 13/18 359/708 |
| 7,206,143 | B2 * | 4/2007 | Kamo | ...................... | G02B 9/34 359/771 |
| 7,433,135 | B2 * | 10/2008 | Sun | .......................... | G02B 9/34 359/569 |

(Continued)

FOREIGN PATENT DOCUMENTS

| CN | 202177732 U | 3/2012 |
| CN | 203643674 U | 6/2014 |

(Continued)

*Primary Examiner* — William R Alexander
*Assistant Examiner* — Jeffrey Madonna
(74) *Attorney, Agent, or Firm* — Oliff PLC

(57) ABSTRACT

There is provided an imaging lens which is low-profile, has a small f-value, and obtains wide field of view which aberrations are properly corrected, in order from an object side to an image side, comprising a first lens having positive refractive power and a convex surface on an object side near an optical axis, a second lens having negative refractive power and a concave surface on the object side near the optical axis, a third lens having positive refractive power and a convex surface on the image side as a double-sided aspheric lens and a fourth lens having negative refractive power and a concave surface on an image side near the optical axis as a double-sided aspheric lens, wherein a conditional expression (1) below is satisfied:

$$8.5 < ih/f < 1.0 \qquad (1)$$

where f denotes the focal length of the overall optical system, and ih denotes maximum image height.

11 Claims, 9 Drawing Sheets

(56) References Cited

U.S. PATENT DOCUMENTS

| | | | |
|---|---|---|---|
| 7,446,954 B2 * | 11/2008 | Sun | G02B 9/34 359/569 |
| 7,643,225 B1 * | 1/2010 | Tsai | G02B 9/34 359/715 |
| 8,619,375 B2 * | 12/2013 | Teraoka | G02B 13/004 359/715 |
| 8,817,390 B2 * | 8/2014 | Hashimoto | G02B 13/004 359/715 |
| 8,879,168 B1 | 11/2014 | Hsu et al. | |
| 8,896,937 B1 | 11/2014 | Hsueh et al. | |
| 8,908,291 B1 | 12/2014 | Chung et al. | |
| 9,429,735 B2 * | 8/2016 | Hsu | G02B 9/34 |
| 2012/0057071 A1 | 3/2012 | Yoneyama et al. | |
| 2012/0147248 A1 | 6/2012 | Okano | |
| 2012/0281299 A1 | 11/2012 | Hsu et al. | |
| 2013/0208171 A1 | 8/2013 | Lai | |
| 2013/0250440 A1 | 9/2013 | Ota | |
| 2013/0335588 A1 | 12/2013 | Matsusaka et al. | |
| 2014/0184895 A1 | 7/2014 | Ahn et al. | |
| 2015/0098009 A1 | 4/2015 | Hsieh | |
| 2015/0160437 A1 | 6/2015 | Wang et al. | |
| 2015/0219877 A1 | 8/2015 | Zhao et al. | |
| 2015/0378129 A1 | 12/2015 | Yuza | |
| 2016/0161708 A1 | 6/2016 | Jang et al. | |
| 2017/0010439 A1 | 1/2017 | Teraoka | |

FOREIGN PATENT DOCUMENTS

| | | |
|---|---|---|
| CN | 103969791 A | 8/2014 |
| CN | 104142557 A | 11/2014 |
| CN | 204178038 U | 2/2015 |
| CN | 104635320 A | 5/2015 |
| CN | 104730685 A | 6/2015 |
| CN | 104730686 A | 6/2015 |
| CN | 104820273 A | 8/2015 |
| JP | 2007-286153 A | 11/2007 |
| JP | 2008-046526 A | 2/2008 |
| JP | 2008-242180 A | 10/2008 |
| JP | 2009-014899 A | 1/2009 |
| JP | 2012-058407 A | 3/2012 |
| JP | 2013-092584 A | 5/2013 |
| JP | 2013-106289 A | 5/2013 |
| JP | 2014-153574 A | 8/2014 |
| JP | 2015-138174 A | 7/2015 |
| JP | 2017-021151 A | 1/2017 |
| TW | 201346322 A | 11/2013 |
| TW | 201403119 A | 1/2014 |
| TW | 201403164 A | 1/2014 |

* cited by examiner

IMAGING LENS

The present application is based on and claims priority of Japanese patent application No. 2015-255116 filed on Dec. 25, 2015, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile mobile terminal such as a mobile phone, smartphone, or PDA (Personal Digital Assistant), or a game console, or an information terminal such as a PC.

Description of the Related Art

In recent years, a market of a mobile terminal comprising an imaging device has been expanded. Almost mobile terminal has a camera function, and high-performance of the camera has been improved. As a smartphone, design of many products becomes low-profile, and requirement of a compact and low-profile imaging device to be mounted becomes increased. An imaging lens mounted in a camera used for self-photographing so called as an in-camera or sub-camera has conventionally designed for about one mega pixel, however in recent years, mainly for 5 mega pixels or more. Since the image sensor has been developed to increase pixel while maintaining compactness, pixel pitch has been very refined and densified. The imaging lens for such image sensor is required to offer high brightness and high resolution, and to be compact and low-profile. There is increased requirement of general user for self-photographing to take a photograph of an object including oneself in a wide range.

There has been proposed a variety of imaging lenses for purpose of use and required function, such as size, function, F-value, and angle. An imaging lens composed of 4 constituent lenses is relatively possible to be small in size and to properly correct aberrations, and there has been proposed many imaging lenses. If an optical system is obtained which is compact, low-profile and bright, addresses the image sensor of high-pixel, and has a wide field of view, however, it is difficult to properly correct aberrations in the peripheral area and there is a problem to obtain proper high image quality throughout the image.

Patent Document 1 (JP-A-2007-286153) discloses an imaging lens which includes, in order from an object side, an aperture stop, a first lens having positive refractive power, a second lens having negative refractive power and a concave surface on an image side, a third lens having positive refractive power, and a fourth lens having negative refractive power and a concave surface on the image side, and high-performance is aimed by setting an appropriate range for a value of curvature radius of the image-side surface of the second lens to focal length of the overall optical system.

Patent Document 2 (JP-A-2008-046526) discloses an imaging lens which includes, in order from an object side, an aperture stop, a first lens having positive refractive power, a second lens having negative refractive power, a third lens having positive refractive power, and a fourth lens having at least one aspheric surface, negative refractive power and a concave surface on the object side, and high-performance is aimed by setting an appropriate range for relation of the refractive power of the first lens and curvature radius between an object-side surface and an image-side surface of the fourth lens.

Patent Document 3 (JP-A-2008-242180) discloses an imaging lens which includes, in order from an object side, an aperture stop, a first lens having positive refractive power, a second lens having negative refractive power, a third lens having positive refractive power, and a fourth lens having at least one aspheric surface, negative refractive power and biconcave shape, and high-performance is aimed by setting an appropriate range for the ratio of the focal length of the overall optical system and the focal length of the first and the third lens.

Patent Document 4 (JP-A-2009-014899) discloses an imaging lens which includes, in order from an object side, an aperture stop, a first lens having positive refractive power and biconvex shape, a second meniscus lens having negative refractive power and a convex surface on an object side, a third meniscus lens having positive refractive power and a convex surface on the image side, and a fourth meniscus lens having negative refractive power and a convex surface on the object side, and high-performance is aimed by setting an appropriate range for relation between central thickness of the first lens and focal length of the first lens, and for abbe number of the second lens and the third lens.

The imaging lens disclosed in the above Patent Documents 1, 2 and 3 has a ratio of about 1.0 of the total track length and the diagonal length of the effective imaging plane of the image sensor, and compactness is relatively realized. However, a half field of view is 30 to 31 degrees, and requirement for wide field of view is not satisfied. F-value is 2.9 to 3.3, and high brightness enough for the image sensor improving high pixel is not secured. The imaging lens disclosed in Patent Document 4 also relatively realizes compactness, however, F-value is 3.2 and enough brightness is not obtained. As mentioned above, conventionally, it is difficult to satisfy compactness, a wide field of view, and requirement of small F-value at the same time.

SUMMARY OF THE INVENTION

The present invention has been made in view of the above problem, and an object thereof is to provide an imaging lens which is compact, low-profile, has small F-value, corrects various aberrations properly, and enables photographing in a wide field of view.

Here, low-profile implies that total track length is 4 mm or less, and ratio of the total track length and the diagonal length of the effective imaging plane of the image sensor (a ratio of total track length to diagonal length) is sufficiently smaller than about 1.0 (it means the total track length is shorter), and low F-value implies brightness having F2.4 or less. A wide field of view implies that the field of view is 80 degrees or more. The diagonal length of the effective imaging plane of the image sensor is considered as an same parameter as twice length of the maximum image height, that is, the vertical height from an optical axis to the point where a light ray incident on the imaging lens at a maximum field of view enters and forming an image on the image plane.

In the present invention, a convex surface or a concave surface means that the paraxial portion of the surface (portion near the optical axis) is convex or concave. A pole point is defined as an off-axial point on an aspheric surface at which a tangential plane intersects the optical axis perpendicularly. The total track length and back focus are defined as value on the optical axis, when the thickness of an optical element not involved in divergence or convergence of light, such as an IR cut filter or cover glass, is air-converted.

An imaging lens according to the present invention comprises, in order from an object side to an image side, a first lens having positive refractive power and a convex surface on an object side near an optical axis, a second lens having negative refractive power and a concave surface on the object side near the optical axis as a double-sided aspheric lens, a third lens having positive refractive power as a double-sided aspheric lens and a fourth lens having negative refractive power and a concave surface on an image side near the optical axis as a double-sided aspheric lens, and the imaging lens satisfies a conditional expression (1) below:

$$8.5 < ih/f < 1.0 \tag{1}$$

where f denotes the focal length of the overall optical system, and ih denotes maximum image height.

According to the imaging lens having the above structure, total track length becomes short by the first lens and the third lens having positive refractive power. The second lens having negative refractive power corrects chromatic aberrations properly generated at the first lens and enables wide field of view by arranging the concave surface on the object side. The third lens and fourth lens form aspheric surfaces on both sides properly and make it easy to correct off-axial aberrations, decrease astigmatic difference and correct distortion, and control of an incident angle of a main light lay to the image sensor.

The conditional expression (1) is a condition for enabling photographing in the wide field of view, and satisfying the conditional expression (1) means that photographing of the field of view of 80 to 90 degrees becomes available. If a value is above the upper limit of the conditional expression (1), correction of aberrations in the peripheral area is limited unpreferably. On the other hand, if the value is below the lower limit of the conditional expression (1), it becomes advantages for correction of aberration, however the wide field of view is not obtained.

The imaging lens having the above structure preferably satisfies the below conditional expression (2).

$$Fno \leq 2.4 \tag{2}$$

where Fno denotes a F-number.

The conditional expression (2) defines F-number of the imaging lens. If the conditional expression (2) is satisfied, bright lens system appropriate to the image sensor which is compact and densified in recent years can be obtained.

The imaging lens having the above structure preferably satisfies the below conditional expression (3).

$$0.1 < |r3/r4| < 0.6 \tag{3}$$

where r3 denotes the curvature radius near an optical axis of the object-side surface of the second lens, and r4 denotes the curvature radius near the optical axis of the image-side surface of the second lens.

The conditional expression (3) defines shape of the second lens near the optical axis. If a value is above the upper limit of the conditional expression (3), refractive power of the second lens becomes weakened, and correction of spherical aberrations and chromatic aberrations is not made properly. On the other hand, if a value is below the lower limit of the conditional expression (3), refractive power of the second lens becomes strong, correction of spherical aberrations and chromatic aberrations becomes excessive, and total balance of aberration is lost.

According to an imaging lens having the above structure, the fourth lens is preferably meniscus shape and a concave surface on the image side near the optical axis, and further preferably satisfies the conditional expression (4).

$$1.2 < (r7+r8)/(r7-r8) < 2.5 \tag{4}$$

where r7 denotes the curvature radius near an optical axis of the object-side surface of the fourth lens, and r8 denotes the curvature radius near the optical axis of the image-side surface of the fourth lens.

The conditional expression (4) defines appropriate range of shape of the fourth lens near the optical axis. The range of the conditional expression (4) is satisfied, and proper back focus is ensured and low-profileness can be achieved.

The imaging lens according to the present invention preferably satisfies the below conditional expression (5).

$$0.15 < |Sag4/D2| < 0.4 \tag{5}$$

where Sag4 denotes an amount of Sag at a maximum effective diameter on the image-side surface of the second lens, and D2 denotes a thickness on the optical axis of the second lens.

The conditional expression (5) properly defines appropriate range of shape of the image-side surface of the second lens to thickness of the second lens on the optical axis. If definition is made in a range of the conditional expression (6), a change in the amount of Sag is formed as a small aspheric shape on the image-side surface of the second lens. Therefore, an air interval from the third lens is formed properly from an area near the optical axis to the periphery area and it becomes easy to achieve low-profileness. The maximum effective diameter of the image-side surface of the second lens is defined as a diameter on a position where light ray incident from a maximum field of view passes on the image-side surface of the second lens.

According to the imaging lens of the present invention, the third lens is a meniscus shape and has a concave surface near the optical axis, and regarding the aspheric shape on the object-side surface, the below conditional expression (6) is preferably satisfied, $$0.02 < |Sag5/D3| < 0.13 \tag{6}$$

where Sag5 denotes an amount of Sag at maximum effective diameter on the object-side surface of the third lens, and D3 denotes a thickness on the optical axis of the third lens.

The conditional expression (6) properly defines appropriate range of shape of the object-side surface of the third lens to thickness of the third lens on the optical axis. If definition is made in a range of the conditional expression (6), a change in the amount of Sag is formed as a small aspheric shape on the object-side surface of the third lens. Therefore, an air interval from the second lens is formed properly from an area near the optical axis to the periphery area, and it becomes easy to achieve low-profileness. The maximum effective diameter of the object-side surface of the second lens is defined as a diameter on a position where light ray incident from a maximum field of view passes on the object-side surface of the second lens.

The conditional expressions (5) and (6) are preferably satisfied at the same time.

The imaging lens according to the present invention preferably satisfies the below conditional expression (7), $$0.14 < |r1/r2| < 0.7 \tag{7}$$

where r1 denotes the curvature radius near an optical axis on the object-side surface of the first lens, and r2 denotes the curvature radius near an optical axis on the image-side surface of the first lens.

The conditional expression (7) defines appropriate range for shape of the first lens near the optical axis. If definition is made in a range of the conditional expression (7), the low-profileness can be maintained and generation of spherical aberrations on the first lens is suppressed.

The imaging lens according to the present invention preferably satisfies the below conditional expression (8), $$-7.5 < f2/f < -2.0 \quad (8)$$

where f2 denotes a focal length of the second lens.

The conditional expression (8) defines appropriate range of focal length of the second lens to focal length of the overall optical system. The second lens is arranged as the weakest lens in refractive power of four lenses. If the conditional expression (8) is satisfied, excessive correction of the chromatic aberrations and spherical aberrations and sensitivity to errors at a timing of production are suppressed and also insufficient chromatic aberrations are suppressed.

The imaging lens of the present invention preferably satisfies the below conditional expression (9), $$0.3 < f3/f < 1.2 \quad (9)$$

where f3 denotes a focal length of the third lens.

The conditional expression (9) defines appropriate range of focal length of the third lens to the focal length of the overall optical system. If the conditional expression (9) is satisfied, it may become easy to control balance of entire aberrations while maintaining low-profileness and the wide field of view.

The imaging lens of the present invention preferably satisfies the below conditional expression (10), $$-0.9 < f4/f < -0.5 \quad (10)$$

where f4 denotes a focal length of the fourth lens.

The conditional expression (10) defines appropriate range of focal length of the fourth lens to the focal length of the overall optical system. If the conditional expression (10) is satisfied, it may become possible to ensure appropriate back focus while maintaining low-profileness.

The imaging lens of the present invention preferably satisfies the below conditional expression (11), $$-1.5 < f5/f < -0.5 \quad (11)$$

where r5 denotes the curvature radius near an optical axis of the object-side surface of the third lens.

The conditional expression (11) defines appropriate range of the curvature radius near an optical axis of the object-side surface of the third lens. If the conditional expression (11) is satisfied, it becomes possible to properly correct coma aberration, astigmatism and distortion while maintaining low-profileness.

The imaging lens of the present invention preferably satisfies the below conditional expression (12), $$0.035 < T3/D3 < 0.2 \quad (12)$$

where T3 denotes a distance on the optical axis from the image-side surface of the third lens to the object-side surface of the fourth lens, and D3 denotes a thickness on the optical axis of the third lens.

Conditional expression (12) defines appropriate range of thickness on the optical axis of the third lens and an interval between the third lens and the fourth lens. If the conditional expression (12) are satisfied, it becomes possible to properly correct astigmatism, astigmatic difference and distortion while maintaining low-profileness.

The imaging lens of the present invention preferably satisfies the below conditional expression (13), $$9.0 < (T1/f)*100 < 16.0 \quad (13)$$

where T1 denotes a distance on the optical axis from the image-side surface of the first lens to the object-side surface of the second lens.

Conditional expression (13) defines appropriate range of a distance on the optical axis from the image-side surface of the first lens to the object-side surface of the second lens. The range of the conditional expression (13) is a condition to correct various aberrations properly and to realize photography in the wide field of view. If the value is above the upper limit of the conditional expression (13), distance of the first lens and the second lens are too far, and it becomes advantages of aberration correction, however, wide field of view and low-profileness becomes difficult. If the value is below the lower limit of the conditional expression (13), it becomes advantages of wide field of view and low-profileness, however, it becomes difficult to correct aberration in peripheral area.

The imaging lens of the present invention preferably satisfies the below conditional expression (14), $$0.55 < TTL/2ih < 0.85 \quad (14)$$

where TTL is a total track length.

The conditional expression (14) is a condition for the low-profilenss of the imaging lens. The range of the conditional expression (14) denotes that the total track length of the imaging lens is sufficiently short to the diagonal length of the effective imaging plane of the image sensor. If the conditional expression (14) is satisfied, the imaging lens sufficiently low-profile which is required in recent years is obtained.

DETAILED DESCRIPTION OF THE PREFERRED EMBODIMENT

Hereinafter, the preferred embodiment of the present invention will be described in detail referring to the accompanying drawings. FIGS. 1, 3, 5 and 7 are schematic views showing the general configurations of the imaging lenses in Examples 1 to 4 according to this embodiment, respectively. Since all these examples have the same basic lens configuration, the general configuration of an imaging lens according to this embodiment is explained below mainly referring to the schematic view of Example 1.

Figure 1:
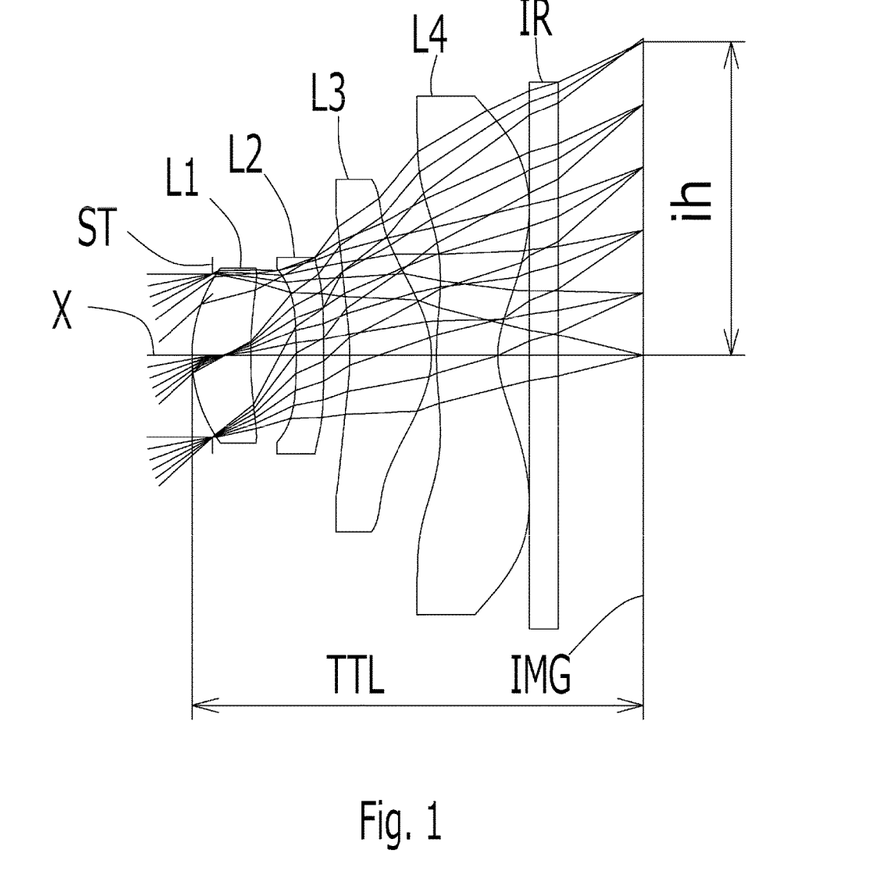
FIG. 1 is a schematic view showing the general configuration of an imaging lens in Example 1 according to an embodiment of the present invention.

As shown in FIG. 1, the imaging lens according to this embodiment is an imaging lens comprises, in order from an object side to an image side, a first lens L1 having positive refractive power and a convex surface on the object side near an optical axis X as a double-sided aspheric lens, a second lens L2 having negative refractive power and a concave surface on the object side near the optical axis as a double-sided aspheric lens, a third lens L3 having positive refractive power as a double-sided aspheric lens, and a fourth lens L4 having negative refractive power and a concave surface on an image side near the optical axis as a double-sided aspheric lens. A filter IR such as an IR cut filter is located between the fourth lens L4 and an image plane IMG. The filter IR is omissible. An aperture stop ST is located nearest to the object side so as to be advantageous for low-profileness.

The imaging lens according to the present embodiment has a structure to make a total track length TTL short by the first lens L1 and the third lens L3 having positive refractive power. The second lens L2 having negative refractive power corrects chromatic aberrations generated at the first lens L1 and enables wide field of view by arranging the concave surface on the object side. The third lens L3 and fourth lens L4 form aspheric surfaces on both sides properly and make it easy to correct off-axial aberrations, decrease astigmatic difference and correct distortion, and control of an incident angle of a main light lay to the image sensor.

The first lens L1 is meniscus and has a convex surface on an object side and a concave surface on an image side near an optical axis X, and a curvature radius near the optical axis on the object-side surface and the image-side surface is determined so as to be proper relation. The refractive power of the first lens L1 is weaken relative to that of the third lens L3.

The second lens L2 is meniscus and has a concave surface on an object side and a convex surface on an image side near the optical axis X, and light ray from a wide field of view can be entered because the object-side surface is designed as a concave surface. Change in the amount of Sag is formed as small aspheric shape over maximum effective diameter from near area of the optical axis X, and it becomes advantages in shape to achieve low-profileness. The second lens L2 has simply negative refractive power and a concave surface on the object side near the optical axis X, and may be double-sided lens having a concave surface on the image side near the optical axis X as shown in Embodiment 3 in FIG. 5.

The third lens L3 is meniscus and has a convex surface on the image side and a concave surface on the object side near the optical axis. The third lens L3 has stronger refractive power than that of the first lens L1, and is large in contribution to low-profileness. Aspheric surfaces on both sides of the third lens L3 properly correct off-axial aberrations. On the object side surface, change of Sag is formed as a small aspheric shape over maximum effective diameter from near area of the optical axis X, there is provided an advantageous shape for low-profileness in addition to the image-side surface of the second lens L2.

The fourth lens L4 is meniscus and has a concave surface on the image side near the optical axis. Due to aspheric surfaces formed on both sides, correction can be properly made on astigmatic difference and distortion. There is provided aspheric shape on which a pole point is formed on area other than the optical axis X and it becomes easy to control an incident angle of a main light lay to the image plane IMG.

The imaging lens according to the present embodiments shows preferable effect by satisfying the below conditional expressions (1) to (14).

$$0.85 < ih/f < 1.0 \quad (1)$$

$$Fno \leq 2.4 \quad (2)$$

$$0.1 < |r3/r4| < 0.6 \quad (3)$$

$$1.2 < (r7+r8)/(r7-r8) < 2.5 \quad (4)$$

$$0.15 < |Sag4/D2| < 0.4 \quad (5)$$

$$0.02 < |Sag5/D3| < 0.13 \quad (6)$$

$$0.14 < |r1/r2| < 0.7 \quad (7)$$

$$-7.5 < f2/f < -2.0 \quad (8)$$

$$0.3 < f3/f < 1.2 \quad (9)$$

$$-0.9 < f4/f < -0.5 \quad (10)$$

$$-1.5 < f5/f < -0.5 \quad (11)$$

$$0.035 < T3/D3 < 0.2 \quad (12)$$

$$9.0 < (T1/f)*100 < 16.0 \quad (13)$$

$$0.55 < TTL/2ih < 0.85 \quad (14)$$

where
   f: focal length of the overall optical system of the imaging lens,
   ih: maximum image height,
   Fno: F-number
   r3: curvature radius near an optical axis of the object-side surface of the second lens L2,
   r4: curvature radius near an optical axis of the image-side surface of the second lens L2,
   r7: curvature radius near an optical axis of the object-side surface of the fourth lens L4,
   r8: curvature radius near an optical axis of the image-side surface of the fourth lens L4,
   Sag4: an amount of Sag at a maximum effective diameter on the image-side surface of the second lens L2,
   D2: a thickness on the optical axis of the second lens L2,
   Sag5: an amount of Sag at a maximum effective diameter on the image-side surface of the third lens L3,
   D3: a thickness on the optical axis of the third lens L3,
   r1: curvature radius near an optical axis of the object-side surface of the first lens L1,
   r2: curvature radius near an optical axis of the image-side surface of the first lens L1,
   f2: focal length of the second lens L2,
   f3: focal length of the third lens L3,
   f4: focal length of the fourth lens L4,
   r5: curvature radius near an optical axis of the object-side surface of the third lens L3,
   T1: a distance on the optical axis X from the image-side surface of the first lens L1 to the object-side surface of the second lens L2,
   T3: a distance on the optical axis X from the image-side surface of the third lens L3 to the object-side surface of the fourth lens L4, and
   TTL: total track length.

Furthermore, the imaging lens according to the present embodiments shows preferable effect by satisfying the below conditional expressions (1a) to (14a).

$$0.85 < ih/f < 0.95 \quad (1a)$$

$$Fno \leq 2.2 \quad (2a)$$

$$0.2 < |r3/r4| < 0.5 \quad (3a)$$

$$1.2 < (r7+r8)/(r7-r8) < 2.0 \quad (4a)$$

$$0.15 < |Sag4/D2| < 0.35 \quad (5a)$$

$$0.03 < |Sag5/D3| < 0.10 \quad (6a)$$

$$0.14 < |r1/r2| < 0.6 \quad (7a)$$

$$-7.5 < f2/f < -3.0 \quad (8a)$$

$$0.45 < f3/f < 1.0 \quad (9a)$$

$$-0.8 < f4/f < -0.55 \quad (10a)$$

$$-1.5 < f5/f < -0.6 \quad (11a)$$

$$0.04 < T3/D3 < 0.15 \quad (12a)$$

$$9.0 < (T1/f) \ast 100 < 14.0 \quad (13a)$$

$$0.6 < TTL/2ih < 0.8 \quad (14a)$$

The signs in the above conditional expressions have the same meanings as those in the paragraph before the preceding paragraph.

Additionally, the imaging lens according to the present embodiments shows more preferable effect by satisfying the below conditional expressions (1b) to (14b).

$$0.85 < ih/f \leq 0.92 \quad (1b)$$

$$Fno \leq 2.1 \quad (2b)$$

$$0.22 \leq |r3/r4| \leq 0.38 \quad (3b)$$

$$1.6 \leq (r7+r8)/(r7-r8) \leq 2.0 \quad (4b)$$

$$0.20 \leq |Sag4/D2| \leq 0.31 \quad (5b)$$

$$0.05 \leq |Sag5/D3| \leq 0.08 \quad (6b)$$

$$0.15 < |r1/r2| \leq 0.37 \quad (7b)$$

$$-6.16 \leq f2/f \leq -2.97 \quad (8b)$$

$$0.56 \leq f3/f < 1.0 \quad (9b)$$

$$-0.77 \leq f4/f < -0.6 \quad (10b)$$

$$-1.45 \leq f5/f \leq -0.77 \quad (11b)$$

$$0.04 < T3/D3 < 0.1 \quad (12b)$$

$$9.0 < (T1/f) \ast 100 \leq 13.3 \quad (13b)$$

$$0.65 < TTL/2ih < 0.8 \quad (14b)$$

The signs in the above conditional expressions have the same meanings as those in the paragraph before the preceding paragraph.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height. Additionally, i denotes surface number counted from the object side, r denotes a curvature radius, d denotes the distance of lenses on the optical axis (surface distance), Nd denotes a refractive index at d-ray (reference wavelength), and vd denotes an Abbe number at d-ray. As for aspheric surfaces, an asterisk (*) is added after surface number i.

Example 1

TABLE 1

Unit [mm]

f = 2.50
Fno = 2.1
ω (°) = 42
ih = 2.29

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.150 | | |
| 2* | 1.104 (=r1) | 0.428 | 1.5443 | 55.86 |
| 3* | 3.005 (=r2) | 0.332 (=T1) | | |
| 4* | −7.371 (=r3) | 0.200 (=D2) | 1.6503 | 21.54 |
| 5* | −28.109 (=r4) | 0.191 (=T2) | | |
| 6* | −1.931 (=r5) | 0.600 (=D3) | 1.5348 | 55.66 |
| 7* | −0.697 (=r6) | 0.036 (=T3) | | |
| 8* | 2.361 (=r7) | 0.447 | 1.5348 | 55.66 |
| 9* | 0.660 (=r8) | 0.232 | | |
| 10 | Infinity | 0.210 | 1.5168 | 64.20 |
| 11 | Infinity | 0.614 | | |
| Image Plane | Infinity | | | |

Constituent Lens Data

| Lens | Start Surface | Focal Length |
|---|---|---|
| 1 | 2 | 2.97 |
| 2 | 4 | −15.42 |
| 3 | 6 | 1.74 |
| 4 | 8 | −1.89 |

Aspheric Surface data

| | Second Surface | Third Surface | Fourth Surface | Fifth Surface |
|---|---|---|---|---|
| k | 0.000E+00 | 0.000E+00 | 0.000E+00 | −9.778E+00 |
| A4 | 2.672E−02 | −4.268E−03 | −3.875E−01 | −2.667E−02 |
| A6 | −1.127E−01 | −4.674E−01 | −1.485E+00 | −1.270E+00 |
| A8 | 5.258E−01 | 1.381E+00 | 3.420E+00 | 2.595E+00 |
| A10 | −8.809E−01 | −3.296E+00 | −6.712E+00 | −2.805E+00 |
| A12 | 0.000E+00 | 5.946E−01 | 7.042E+00 | 1.267E+00 |

TABLE 1-continued

| | | | | |
|---|---|---|---|---|
| A14 | 0.000E+00 | 0.000E+00 | 0.000E+00 | 2.439E+00 |
| A16 | 0.000E+00 | 0.000E+00 | 0.000E+00 | 0.000E+00 |

| | Sixth Surface | Seventh Surface | Eighth Surface | Ninth Surface |
|---|---|---|---|---|
| k | 0.000E+00 | −4.016E+00 | 0.000E+00 | −5.205E+00 |
| A4 | 5.595E−01 | −2.912E−01 | −4.937E−01 | −2.377E−01 |
| A6 | −8.030E−01 | 7.065E−01 | 4.315E−01 | 2.100E+00 |
| A8 | 6.128E−01 | −9.996E−01 | −3.890E−01 | −1.570E−01 |
| A10 | −1.774E−01 | 1.318E+00 | 2.940E−01 | 7.757E−02 |
| A12 | −7.912E−03 | −1.089E+00 | −1.318E−01 | −2.371E−02 |
| A14 | 0.000E+00 | 4.514E−01 | 3.040E−02 | 3.981E−03 |
| A16 | 0.000E+00 | −7.367E−02 | −2.822E−03 | −2.761E−04 |

The imaging lens in Example 1 satisfies all of conditional expressions (1) to (14) as shown in Table 5.

Figure 2:
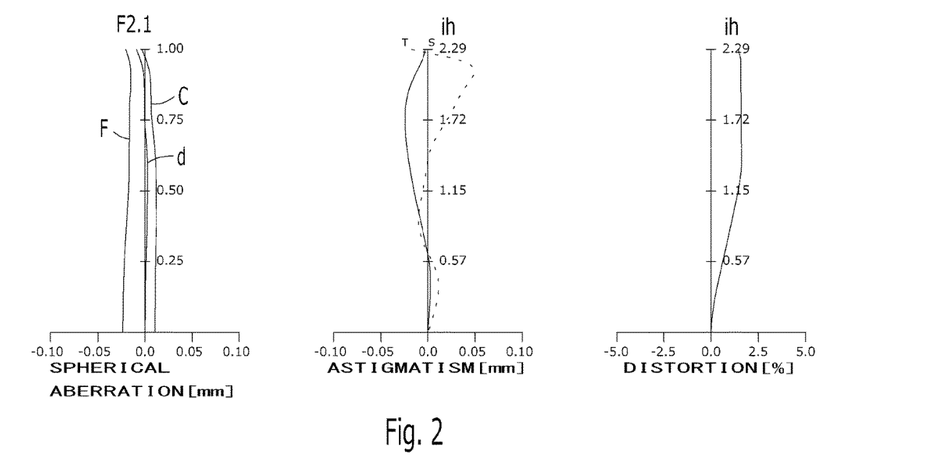
FIG. 2 shows spherical aberration, astigmatism, and distortion of the imaging lens in Example 1 according to the embodiment of the present invention.
Figure 3:
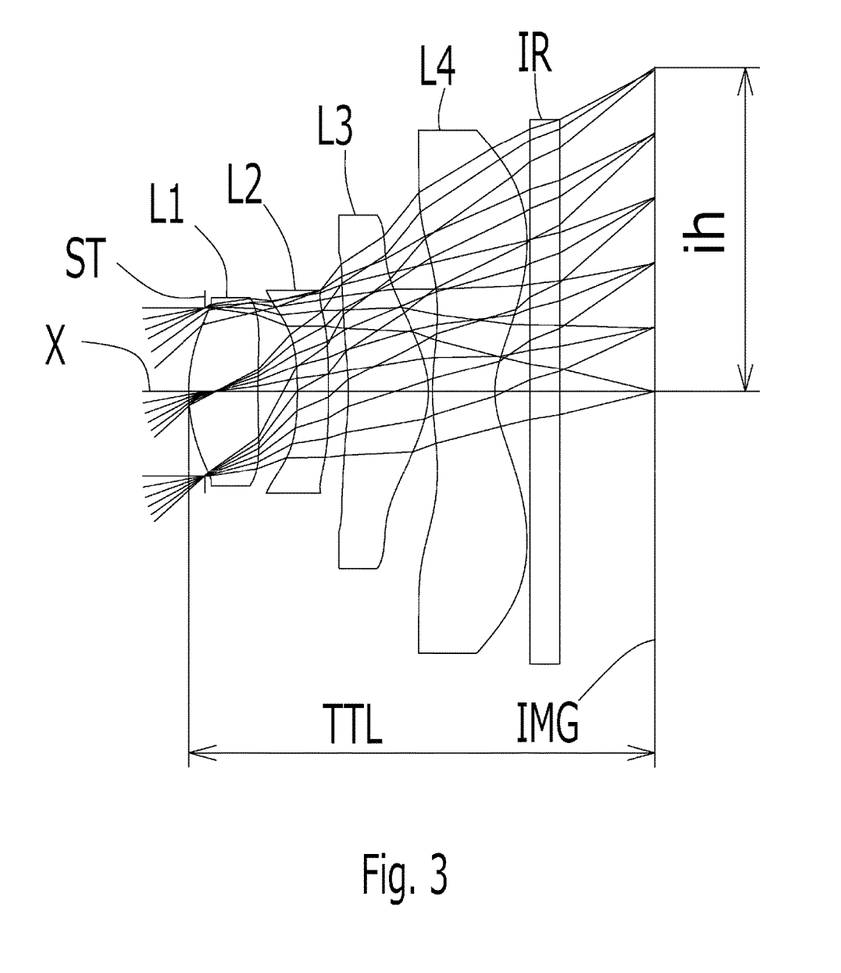
FIG. 3 is a schematic view showing the general configuration of an imaging lens in Example 2 according to the embodiment of the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram and distortion diagram show the amount of aberration at d-ray. The astigmatism diagram shows sagittal image surface S and the amount of aberration on tangential image surface T. As shown in FIG. 2, each aberration is corrected properly.

Furthermore, the total track length TTL is less than 3.3 mm, ratio of total track length to diagonal length is 0.7, and there is realized photographing having brightness of F2.1, field of view of 2ω and 80 degrees or more, while maintaining being compact and low-profileness.

Example 2

TABLE 2

Unit [mm]

f = 2.49
Fno = 2.1
ω (°) = 42
ih = 2.29

Surface Data

| Surface Number i (Object) | Curvature Radius r Infinity | Surface Distance d Infinity | Refractive Index Nd | Abbe Number νd |
|---|---|---|---|---|
| 1 (Stop) | Infinity | −0.113 | | |
| 2* | 1.198 (=r1) | 0.489 | 1.5443 | 55.86 |
| 3* | 5.731 (=r2) | 0.279 (=T1) | | |
| 4* | −2.910 (=r3) | 0.220 (=D2) | 1.6503 | 21.54 |
| 5* | −7.565 (=r4) | 0.140 (=T2) | | |
| 6* | −1.977 (=r5) | 0.569 (=D3) | 1.5348 | 55.66 |
| 7* | −0.693 (=r6) | 0.030 (=T3) | | |
| 8* | 1.977 (=r7) | 0.440 | 1.5348 | 55.66 |
| 9* | 0.625 (=r8) | 0.248 | | |
| 10 | Infinity | 0.210 | 1.5168 | 64.20 |
| 11 | Infinity | 0.664 | | |
| Image Plane | Infinity | | | |

Constituent Lens Data

| Lens | Start Surface | Focal Length |
|---|---|---|
| 1 | 2 | 2.68 |
| 2 | 4 | −7.41 |
| 3 | 6 | 1.73 |
| 4 | 8 | −1.92 |

TABLE 2-continued

Aspheric Surface data

| | Second Surface | Third Surface | Fourth Surface | Fifth Surface |
|---|---|---|---|---|
| k | 0.000E+00 | 0.000E+00 | 0.000E+00 | −9.778E+00 |
| A4 | 1.539E−02 | −2.500E−01 | −6.829E−01 | 5.805E−02 |
| A6 | −4.730E−01 | 9.864E−03 | −4.013E+00 | −2.370E+00 |
| A8 | 1.627E+00 | −2.204E+00 | −3.979E+00 | 7.204E+00 |
| A10 | −3.099E+00 | 2.885E+00 | 2.096E+01 | −1.272E+01 |
| A12 | 0.000E+00 | −1.261E+00 | −2.001E+01 | 1.911E+01 |
| A14 | 0.000E+00 | 0.000E+00 | 0.000E+00 | −1.214E+01 |
| A16 | 0.000E+00 | 0.000E+00 | 0.000E+00 | 0.000E+00 |

| | Sixth Surface | Seventh Surface | Eighth Surface | Ninth Surface |
|---|---|---|---|---|
| k | 0.000E+00 | −4.649E+00 | 0.000E+00 | −5.140E+00 |
| A4 | 9.336E−01 | −3.942E−01 | −6.217E−01 | −2.720E−01 |
| A6 | −2.340E+00 | 1.337E+00 | 5.986E−01 | 2.579E−01 |
| A8 | 3.477E+00 | −2.342E+00 | −5.156E−01 | −1.953E−01 |
| A10 | −2.589E+00 | 3.060E+00 | 3.681E−01 | 9.881E−02 |
| A12 | 7.206E−01 | −2.473E+00 | −1.661E−01 | −3.148E−02 |
| A14 | 0.000E+00 | 1.041E+00 | 3.987E−02 | 5.587E−03 |
| A16 | 0.000E+00 | −1.758E−01 | −3.905E−03 | −4.136E−04 |

The imaging lens in Example 2 satisfies all of conditional expressions (1) to (14) as shown in Table 5.

Figure 4:
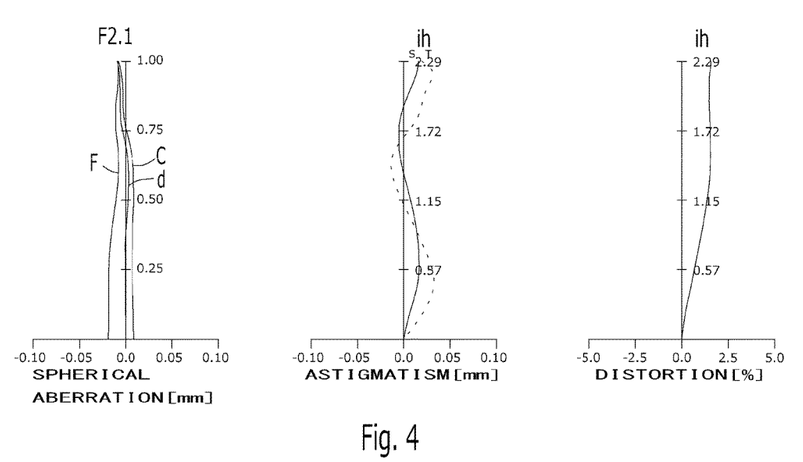
FIG. 4 shows spherical aberration, astigmatism, and distortion of the imaging lens in Example 2 according to the embodiment of the present invention.
Figure 5:
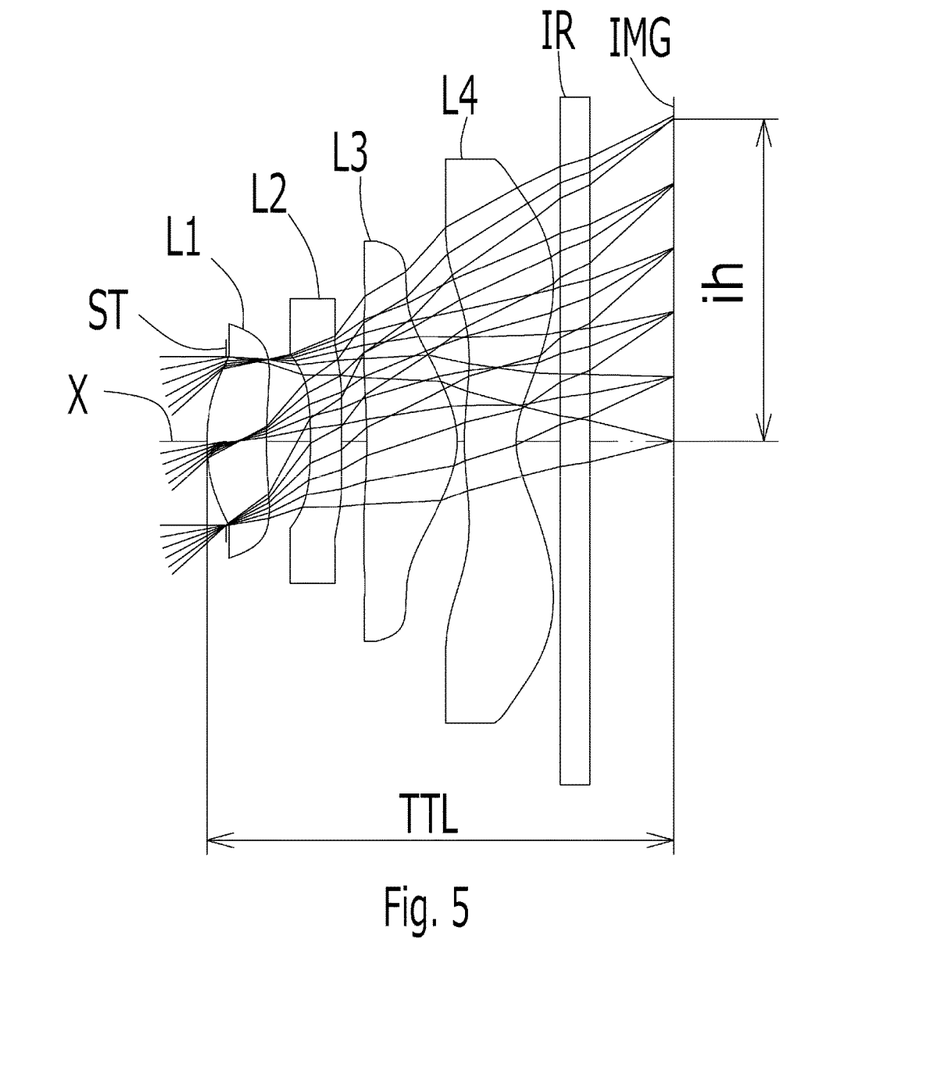
FIG. 5 is a schematic view showing the general configuration of an imaging lens in Example 3 according to the embodiment of the present invention.

FIG. 4 shows spherical aberration (mm), astigmatism (mm), and distortion (%) of the imaging lens in Example 2. The spherical aberration diagram shows the amount of aberration at wavelengths of F-ray (486 nm), d-ray (588 nm), and C-ray (656 nm). The astigmatism diagram and distortion diagram show the amount of aberration at d-ray. The astigmatism diagram shows sagittal image surface S and the amount of aberration on tangential image surface T. As shown in FIG. 4, each aberration is corrected properly.

Furthermore, the total track length TTL is less than 3.3 mm, ratio of total track length to diagonal length is 0.7, and there is realized photographing having brightness of F2.1, field of view of 2ω and 80 degrees or more, while maintaining being compact and low-profileness.

Example 3

TABLE 3

Unit [mm]

f = 2.49
Fno = 2.1
ω (°) = 42
ih = 2.30

Surface Data

| Surface Number i (Object) | Curvature Radius r Infinity | Surface Distance d Infinity | Refractive Index Nd | Abbe Number νd |
|---|---|---|---|---|
| 1 (Stop) | Infinity | −0.142 | | |
| 2* | 1.176 (=r1) | 0.428 | 1.5443 | 55.86 |
| 3* | 3.913 (=r2) | 0.312 (=T1) | | |
| 4* | −5.096 (=r3) | 0.221 (=D2) | 1.6503 | 21.54 |
| 5* | 22.954 (=r4) | 0.180 (=T2) | | |
| 6* | −3.620 (=r5) | 0.645 (=D3) | 1.5348 | 55.66 |
| 7* | −0.655 (=r6) | 0.052 (=T3) | | |
| 8* | 2.191 (=r7) | 0.367 | 1.5348 | 55.66 |
| 9* | 0.570 (=r8) | 0.313 | | |
| 10 | Infinity | 0.210 | 1.5168 | 64.20 |
| 11 | Infinity | 0.590 | | |
| Image Plane | Infinity | | | |

TABLE 3-continued

Constituent Lens Data

| Lens | Start Surface | Focal Length |
|---|---|---|
| 1 | 2 | 2.93 |
| 2 | 4 | −6.39 |
| 3 | 6 | 1.39 |
| 4 | 8 | −1.56 |

Aspheric Surface data

|  | Second Surface | Third Surface | Fourth Surface | Fifth Surface |
|---|---|---|---|---|
| k   | 0.000E+00  | 0.000E+00  | 0.000E+00  | 6.357E+01 |
| A4  | 3.844E−03  | −9.705E−02 | −5.671E−01 | −2.374E−01 |
| A6  | −2.010E−01 | −4.258E−01 | −1.065E+00 | −6.236E−01 |
| A8  | 8.596E−01  | 4.119E−01  | 3.700E+00  | 1.897E+00 |
| A10 | −1.904E+00 | −1.982E+00 | −9.742E+00 | −2.771E+00 |
| A12 | 0.000E+00  | 5.995E−01  | 1.279E+01  | 3.163E+00 |
| A14 | 0.000E+00  | 0.000E+00  | 0.000E+00  | −3.500E−01 |
| A16 | 0.000E+00  | 0.000E+00  | 0.000E+00  | 0.000E+00 |

|  | Sixth Surface | Seventh Surface | Eighth Surface | Ninth Surface |
|---|---|---|---|---|
| k   | 0.000E+00  | −4.189E+00 | 0.000E+00  | −4.749E+00 |
| A4  | 3.707E−01  | −2.664E−01 | −5.021E−01 | −2.388E−01 |
| A6  | −5.897E−01 | 6.425E−01  | 4.282E−01  | 2.114E−01 |
| A8  | 5.894E−01  | −9.472E−01 | −3.894E−01 | −1.569E−01 |
| A10 | −2.889E−01 | 1.320E+00  | 2.952E−01  | 7.762E−02 |
| A12 | 4.576E−02  | −1.098E+00 | −1.319E−01 | −2.385E−02 |
| A14 | 0.000E+00  | 4.487E−01  | 3.033E−02  | 4.043E−03 |
| A16 | 0.000E+00  | −7.126E−02 | −2.807E−03 | −2.842E−04 |

The imaging lens in Example 3 satisfies all of conditional expressions (1) to (14) as shown in Table 5.

Figure 6:
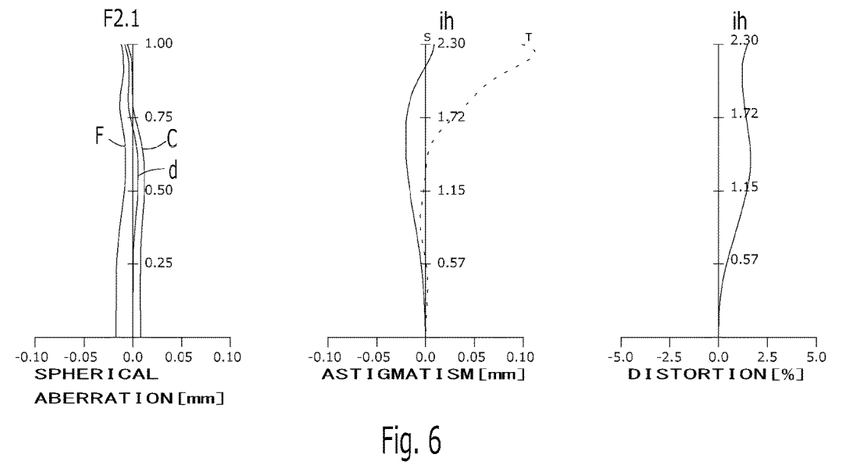
FIG. 6 shows spherical aberration, astigmatism, and distortion of the imaging lens in Example 3 according to the embodiment of the present invention.
Figure 7:
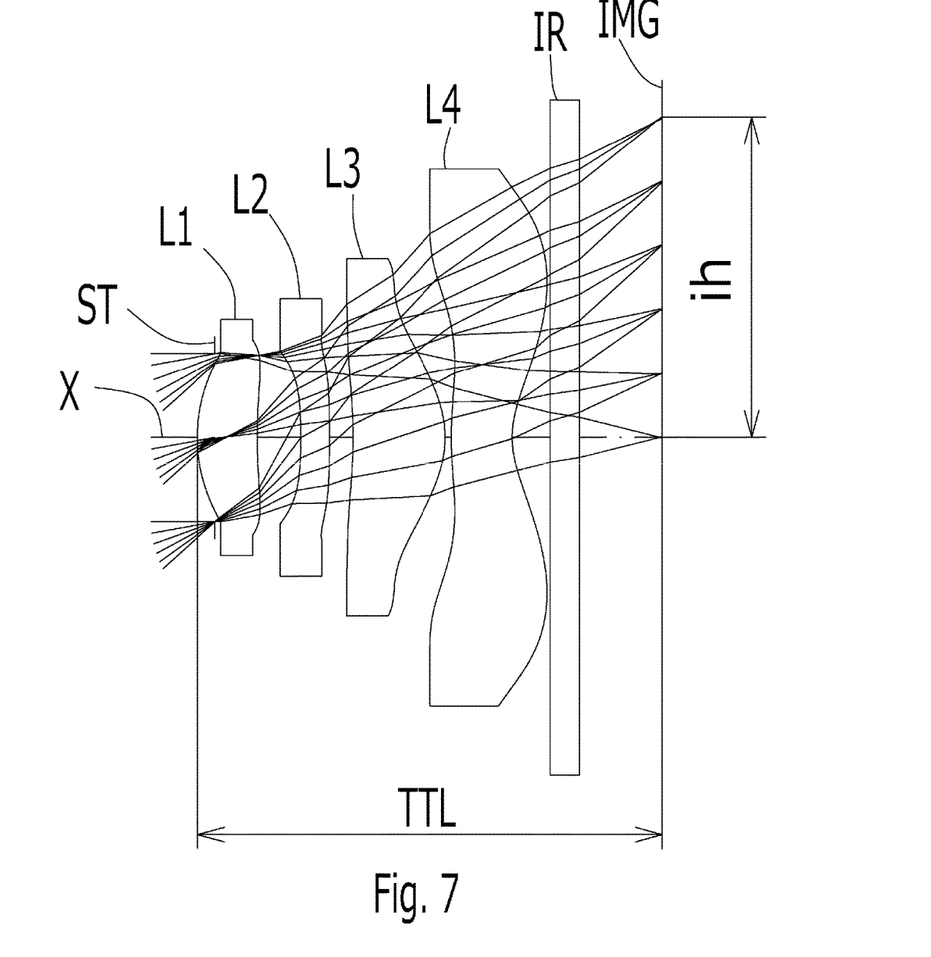
FIG. 7 is a schematic view showing the general configuration of an imaging lens in Example 4 according to the embodiment of the present invention.

FIG. 6 shows spherical aberration (mm), astigmatism (mm), and distortion (%) of the imaging lens in Example 3. The spherical aberration diagram shows the amount of aberration at wavelengths of F-ray (486 nm), d-ray (588 nm), and C-ray (656 nm). The astigmatism diagram and distortion diagram show the amount of aberration at d-ray. The astigmatism diagram shows sagittal image surface S and the amount of aberration on tangential image surface T. As shown in FIG. 6, each aberration is corrected properly.

Furthermore, the total track length TTL is less than 3.3 mm, ratio of total track length to diagonal length is 0.71, and there is realized photographing having brightness of F2.1, field of view of 2ω and 80 degrees or more, while maintaining being compact and low-profileness.

Example 4

TABLE 4

Unit [mm]

f = 2.50
Fno = 2.1
ω (°) = 42
ih = 2.30

Surface Data

| Surface Number i (Object) | Curvature Radius r | Surface Distance d | Refractive Index Nd | Abbe Number vd |
|---|---|---|---|---|
|   | Infinity | Infinity |   |   |
| 1 (Stop) | Infinity | −0.126 |   |   |
| 2* | 1.149 (=r1) | 0.429 | 1.5443 | 55.86 |
| 3* | 3.845 (=r2) | 0.312 (=T1) |   |   |
| 4* | −4.009 (=r3) | 0.205 (=D2) | 1.6503 | 21.54 |

TABLE 4-continued

| 5* | −13.683 (=r4) | 0.169 (=T2) |   |   |
| 6* | −2.895 (=r5)  | 0.661 (=D3) | 1.5348 | 55.66 |
| 7* | −0.730 (=r6)  | 0.044 (=T3) |   |   |
| 8* | 2.508 (=r7)   | 0.435 | 1.5348 | 55.66 |
| 9* | 0.654 (=r8)   | 0.271 |   |   |
| 10 | Infinity | 0.210 | 1.5168 | 64.20 |
| 11 | Infinity | 0.584 |   |   |
| Image Plane | Infinity |   |   |   |

Constituent Lens Data

| Lens | Start Surface | Focal Length |
|---|---|---|
| 1 | 2 | 2.85 |
| 2 | 4 | −8.79 |
| 3 | 6 | 1.65 |
| 4 | 8 | −1.80 |

Aspheric Surface data

|  | Second Surface | Third Surface | Fourth Surface | Fifth Surface |
|---|---|---|---|---|
| k   | 0.000E+00  | 0.000E+00  | 0.000E+00  | 4.511E+01 |
| A4  | 1.097E−02  | −7.734E−02 | −5.250E−01 | −1.880E−01 |
| A6  | −2.031E−01 | −4.961E−01 | −1.055E+00 | −6.153E−01 |
| A8  | 8.869E−01  | 6.684E−01  | 3.316E+00  | 1.779E+00 |
| A10 | −1.961E+00 | −1.875E+00 | −9.032E+00 | −2.449E+00 |
| A12 | 0.000E+00  | −3.164E+00 | 1.268E+01  | 3.517E+00 |
| A14 | 0.000E+00  | 5.540E+00  | 0.000E+00  | −7.234E−01 |
| A16 | 0.000E+00  | 0.000E+00  | 0.000E+00  | 0.000E+00 |

|  | Sixth Surface | Seventh Surface | Eighth Surface | Ninth Surface |
|---|---|---|---|---|
| k   | 0.000E+00  | −3.913E+00 | 0.000E+00  | −4.785E+00 |
| A4  | 3.521E−01  | −2.534E−01 | −5.003E−01 | −2.374E−01 |
| A6  | −5.472E−01 | 5.865E−01  | 4.381E−01  | 2.116E−01 |
| A8  | 6.198E−01  | −8.981E−01 | −3.908E−01 | −1.574E−01 |
| A10 | −3.406E−01 | 1.319E+00  | 2.952E−01  | 7.790E−02 |
| A12 | 4.210E−02  | −1.106E+00 | −1.321E−01 | −2.393E−02 |
| A14 | 2.018E−03  | 4.453E−01  | 3.042E−02  | 4.046E−03 |
| A16 | 0.000E+00  | −6.954E−02 | −2.829E−03 | −2.831E−04 |

The imaging lens in Example 4 satisfies all of conditional expressions (1) to (14) as shown in Table 5.

Figure 8:
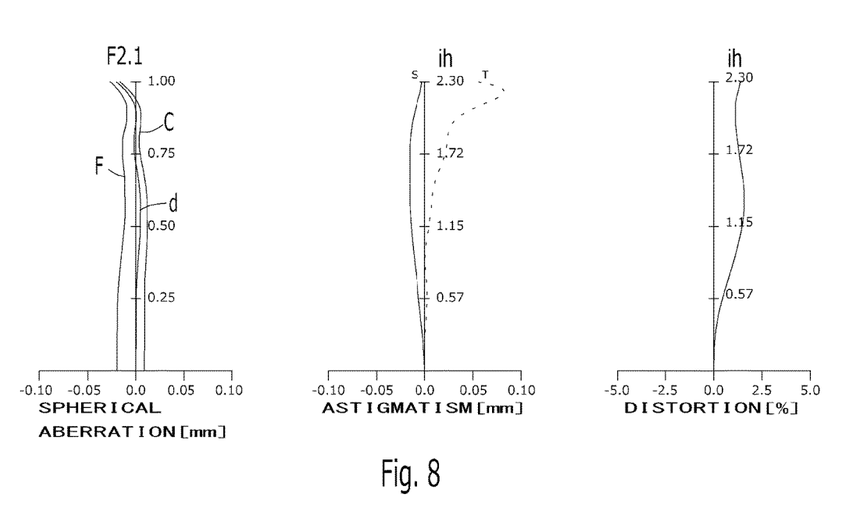
FIG. 8 shows spherical aberration, astigmatism, and distortion of the imaging lens in Example 4 according to the embodiment of the present invention.
Figure 9:
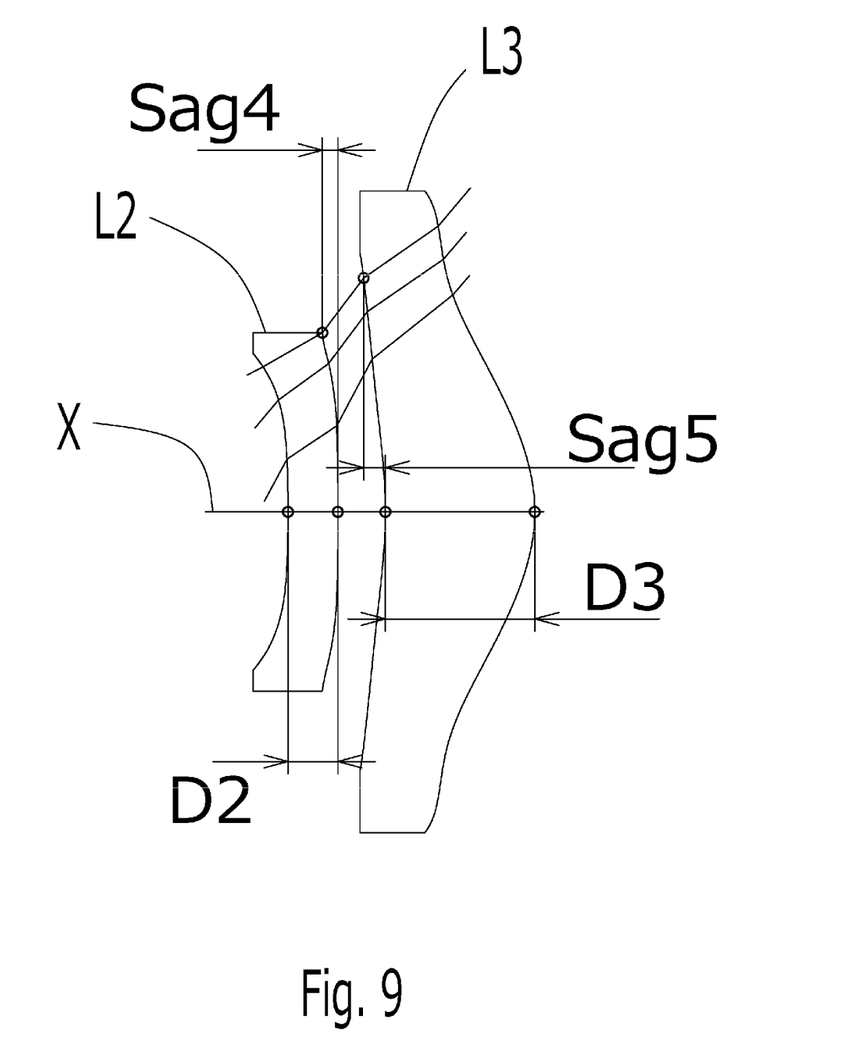
FIG. 9 is a view showing an amount of Sag at a maximum effective diameter on the image-side surface of the second lens and an amount of Sag at a maximum effective diameter on the object-side surface of the third lens.

FIG. 8 shows spherical aberration (mm), astigmatism (mm), and distortion (%) of the imaging lens in Example 3. The spherical aberration diagram shows the amount of aberration at wavelengths of F-ray (486 nm), d-ray (588 nm), and C-ray (656 nm). The astigmatism diagram and distortion diagram show the amount of aberration at d-ray. The astigmatism diagram shows sagittal image surface S and the amount of aberration on tangential image surface T. As shown in FIG. 8, each aberration is corrected properly.

Furthermore, the total track length TTL is less than 3.3 mm, ratio of total track length to diagonal length is 0.71, and there is realized photographing having brightness of F2.1, field of view of 2ω and 80 degrees or more, while maintaining being compact and low-profileness.

Each parameter of Examples 1 to 4, and value of the conditional expressions (1) to (14) are shown in Table 5.

Example 5

TABLE 5

| Parameters | Example 1 | Example 2 | Example 3 | Example 4 |
|---|---|---|---|---|
| f | 2.50 | 2.49 | 2.49 | 2.50 |
| ih | 2.29 | 2.29 | 2.30 | 2.30 |
| Fno | 2.1 | 2.1 | 2.1 | 2.1 |
| r3 | −7.371 | −2.910 | −5.096 | −4.009 |
| r4 | −28.109 | −7.565 | 22.954 | −13.683 |
| r7 | 2.361 | 1.977 | 2.191 | 2.508 |
| r8 | 0.660 | 0.625 | 0.570 | 0.654 |
| Sag4 | −0.06 | −0.06 | −0.05 | −0.06 |
| D2 | 0.200 | 0.220 | 0.221 | 0.205 |
| Sag5 | −0.10 | −0.06 | −0.02 | −0.05 |
| D3 | 0.600 | 0.569 | 0.645 | 0.661 |
| r1 | 1.104 | 1.198 | 1.176 | 1.149 |
| r2 | 3.005 | 5.731 | 3.913 | 3.845 |
| f2 | −15.42 | −7.41 | −6.39 | −8.79 |
| f3 | 1.74 | 1.73 | 1.39 | 1.65 |
| f4 | −1.89 | −1.92 | −1.56 | −1.80 |
| r5 | −1.931 | −1.977 | −3.620 | −2.895 |
| T1 | 0.332 | 0.279 | 0.312 | 0.312 |
| T3 | 0.036 | 0.030 | 0.052 | 0.044 |
| TTL | 3.219 | 3.218 | 3.247 | 3.248 |
| (1) 0.85 < ih/f < 1.0 | 0.91 | 0.92 | 0.92 | 0.92 |
| (2) Fno ≤ 2.4 | 2.1 | 2.1 | 2.1 | 2.1 |
| (3) 0.1 < \|r3/r4\| < 0.6 | 0.26 | 0.38 | 0.22 | 0.29 |
| (4) 1.2 < (r7 + r8)/(r7 − r8) < 2.5 | 1.78 | 1.92 | 1.70 | 1.71 |
| (5) 0.15 < \|Sag4/D2\| < 0.4 | 0.31 | 0.25 | 0.20 | 0.27 |
| (6) 0.02 < \|Sag5/D3\| < 0.13 | 0.17 | 0.11 | 0.03 | 0.07 |
| (7) 0.14 < \|r1/r2\| < 0.7 | 0.37 | 0.21 | 0.30 | 0.30 |
| (8) −7.5 < f2/f < −2.0 | −6.16 | −2.97 | −2.56 | −3.51 |
| (9) 0.3 < f3/f < 1.2 | 0.70 | 0.69 | 0.56 | 0.66 |
| (10) −0.9 < f4/f < −0.5 | −0.75 | −0.77 | −0.63 | −0.72 |
| (11) −1.5 < r5/f < −0.5 | −0.77 | −0.79 | −1.45 | −1.16 |
| (12) 0.035 < T3/D3 < 0.2 | 0.06 | 0.05 | 0.08 | 0.07 |
| (13) 9.0 < (T1/f)*100 < 16.0 | 13.3 | 11.2 | 12.5 | 12.5 |
| (14) 0.55 < TTL/2ih < 0.85 | 0.70 | 0.70 | 0.71 | 0.71 |

As explained so far, if the imaging lens according to each embodiment of the present invention is applied to a mobile terminal such as a mobile phone, smartphone, or PDA (Personal Digital Assistant), or an imaging device mounted in a game console, the camera having high-performance and contributing to low-profileness of the device can be obtained.

According to the present invention, there is obtained the bright imaging lens for properly correcting aberrations, being compact, and having wide field of view enabling low-profileness.

What is claimed is:

1. An imaging lens, in order from an object side to an image side, comprising:
a first lens having a meniscus shape with positive refractive power and a convex surface on the object side near an optical axis;
a second lens having negative refractive power and a concave surface on the object side near the optical axis;
a third lens having positive refractive power and a convex surface on the image side as a double-sided aspheric lens; and
a fourth lens having a meniscus shape with negative refractive power and a concave surface on the image side near the optical axis as a double-sided aspheric lens, wherein:
conditional expressions (1), (7), (10), (11a), and (13) below are satisfied:

$$0.85 < ih/f < 1.0 \tag{1}$$

$$0.14 < |r1/r2| < 0.7 \tag{7}$$

$$-0.9 < f4/f < -0.6 \tag{10}$$

$$-1.5 < r5/f < -0.6 \tag{11a}$$

$$9.0 < (T1/f)*100 < 16.0 \tag{13}$$

where f denotes a focal length of an overall optical system, ih denotes maximum image height, r1 denotes a curvature radius near the optical axis on an object-side surface of the first lens, r2 denotes a curvature radius near the optical axis on an image-side surface of the first lens, f4 denotes a focal length of the fourth lens, r5 denotes a curvature radius near the optical axis of an object-side surface of the third lens, and T1 denotes a distance on the optical axis from the image-side surface of the first lens to an object-side surface of the second lens.

2. The imaging lens according to claim 1, wherein a conditional expression (2) below is satisfied:

$$Fno \leq 2.4 \tag{2}$$

where Fno denotes a F-number.

3. The imaging lens according to claim 2, wherein a conditional expression (3) below is satisfied:

$$0.1 < |r3/r4| < 0.6 \tag{3}$$

where r3 denotes a curvature radius near an optical axis of the object-side surface of the second lens, and r4 denotes a curvature radius near the optical axis of an image-side surface of the second lens.

4. The imaging lens according to claim 3, wherein a conditional expression (4) below is satisfied:

$$1.2 < (r7+r8)/(r7-r8) < 2.5 \tag{4}$$

where r7 denotes a curvature radius near an optical axis of an object-side surface of the fourth lens, and r8 denotes a curvature radius near the optical axis of an image-side surface of the fourth lens.

5. The imaging lens according to claim 4, wherein a conditional expression (5) below is satisfied:

$$0.15 < |Sag4/D2| < 0.4 \tag{5}$$

where Sag4 denotes an amount of Sag at a maximum effective diameter on the image-side surface of the second lens, and D2 denotes a thickness on the optical axis of the second lens.

6. The imaging lens according to claim 4, wherein a conditional expression (6) below is satisfied:

$$0.02 < |Sag5/D3| < 0.13 \tag{6}$$

where Sag5 denotes an amount of Sag at maximum effective diameter on the object-side surface of the third lens, and D3 denotes a thickness on the optical axis of the third lens.

7. The imaging lens according to claim 3, wherein a conditional expression (8) below is satisfied:

$$-7.5 < f2/f < -2.0 \tag{8}$$

where f2 denotes a focal length of the second lens.

8. The imaging lens according to claim 2, wherein a conditional expression (9) below is satisfied:

$$0.3 < f3/f < 1.2 \tag{9}$$

where f3 denotes a focal length of the third lens.

9. The imaging lens according to claim 2, wherein a refractive power of the third lens is most strong among a refractive power of the first lens, the second lens, the third lens, and the fourth lens.

10. The imaging lens according to claim 2, wherein a conditional expression (12) below is satisfied:

$$0.035 < T3/D3 < 0.2 \tag{12}$$

where T3 denotes a distance on the optical axis from an image-side surface of the third lens to an object-side surface of the fourth lens, and D3 denotes a thickness on the optical axis of the third lens.

11. The imaging lens according to claim 1, wherein a conditional expression (14) below is satisfied:

$$0.55 < TTL/2ih < 0.85 \tag{14}$$

where TTL is a total track length.

* * * * *